United States Patent
Tierney et al.

(10) Patent No.: US 12,022,371 B2
(45) Date of Patent: Jun. 25, 2024

(54) METHOD AND SYSTEM FOR MANAGING ELECTRONIC DATA REPRESENTING EMERGENCY ALERTS

(71) Applicant: SOCIAL ASSET MANAGEMENT INC., Edmonton (CA)

(72) Inventors: Louise Noelle Tierney, London (GB); James Andrew Neufeld, Edmonton (CA); Sean Mark Solbak, Edmonton (CA); Adam Joseph St Arnaud, Edmonton (CA)

(73) Assignee: SOCIAL ASSET MANAGEMENT INC., Edmonton (CA)

( * ) Notice: Subject to any disclaimer, the term of this patent is extended or adjusted under 35 U.S.C. 154(b) by 669 days.

(21) Appl. No.: 17/127,193

(22) Filed: Dec. 18, 2020

(65) Prior Publication Data

US 2022/0201455 A1 Jun. 23, 2022

(51) Int. Cl.
| | |
|---|---|
| *H04W 4/90* | (2018.01) |
| *G06F 40/205* | (2020.01) |
| *G06N 5/04* | (2023.01) |
| *G06N 20/00* | (2019.01) |
| *G06Q 10/107* | (2023.01) |
| *G06Q 50/00* | (2012.01) |
| *G06Q 50/26* | (2012.01) |
| *H04W 4/029* | (2018.01) |
| *G01C 21/36* | (2006.01) |

(52) U.S. Cl.
CPC ............... *H04W 4/90* (2018.02); *G06N 5/04* (2013.01); *G06N 20/00* (2019.01); *G06Q 50/01* (2013.01); *H04W 4/029* (2018.02); *G01C 21/36* (2013.01); *G06F 40/205* (2020.01); *G06Q 10/107* (2013.01); *G06Q 50/265* (2013.01)

(58) Field of Classification Search
CPC .......... H04W 4/90; H04W 4/029; G06N 5/04; G06N 20/00; G01C 21/36; G06F 40/205; G06Q 10/107; G06Q 50/265
See application file for complete search history.

(56) References Cited

U.S. PATENT DOCUMENTS

| | | |
|---|---|---|
| 8,719,302 B2 | 5/2014 | Bailey et al. |
| 9,319,450 B2 | 4/2016 | Daly et al. |
| 10,109,023 B2 | 10/2018 | Shah et al. |
| 10,326,847 B1 | 6/2019 | Jammalamadaka et al. |
| 10,356,027 B2 | 7/2019 | Garcia et al. |
| 10,629,053 B2 | 4/2020 | Werner et al. |
| 10,652,190 B2 | 5/2020 | Nourbakhsh et al. |
| 10,747,606 B1 * | 8/2020 | Shemer ................. G06F 11/079 |
| 10,942,913 B1 * | 3/2021 | Khoyilar ................. G06F 9/542 |
| 2013/0073400 A1 * | 3/2013 | Heath ..................... G06Q 50/01 715/738 |
| 2014/0236882 A1 | 8/2014 | Rishe |

(Continued)

*Primary Examiner* — Asghar H Bilgrami
(74) *Attorney, Agent, or Firm* — Perry + Currier Inc.

(57) ABSTRACT

A system and method are provided for the management of electronic data representing emergency alerts. The system includes a server that receives social media data records representing an emergency event and computes a corresponding severity metric. If the severity metric exceeds a threshold, the server transmits a control signal from a server to a computing device. The control signal can cause the computing device to control an alarm system, vehicle navigation system, automated email system, user interface, or automated messaging system.

13 Claims, 9 Drawing Sheets

(56) References Cited

U.S. PATENT DOCUMENTS

| | | | | |
|---|---|---|---|---|
| 2014/0368601 | A1* | 12/2014 | deCharms | H04N 7/148 |
| | | | | 348/14.02 |
| 2016/0217381 | A1* | 7/2016 | Bloomquist | G06Q 10/06375 |
| 2016/0307286 | A1* | 10/2016 | Miasnik | H04W 4/029 |
| 2019/0007377 | A1* | 1/2019 | Bender | H04L 63/0421 |
| 2019/0174289 | A1* | 6/2019 | Martin | H04W 4/90 |
| 2019/0244308 | A1* | 8/2019 | Albertine | G06Q 10/02 |
| 2019/0342252 | A1* | 11/2019 | Dascola | G06F 3/016 |
| 2020/0126174 | A1* | 4/2020 | Halse | G06Q 50/265 |
| 2020/0372372 | A1* | 11/2020 | Jasionowski | G06N 7/01 |
| 2020/0389551 | A1* | 12/2020 | Vaughn | H04M 3/42059 |
| 2022/0179665 | A1* | 6/2022 | Rathod | G06F 9/451 |

* cited by examiner

METHOD AND SYSTEM FOR MANAGING ELECTRONIC DATA REPRESENTING EMERGENCY ALERTS

FIELD

The present specification relates to computer networking communications and more specifically computer networking involving the management of electronic data representing emergency alerts.

BACKGROUND

Social media platforms can provide a wealth of information, insights, and reports. When an emergency event occurs, social media users are often the first source of information with journalists arriving on the scene at a later time. However, the sheer volume of data available on social media platforms can be overwhelming. This can lead to an inefficient use of computing resources including device memory, network bandwidth, and load on servers.

SUMMARY

It is an aspect of the present disclosure to provide a system for managing electronic data representing electronic alerts.

The above aspects can be attained by a server and a computing device. The computing device is associated with an asset and is configured to transmit asset location information corresponding to the location of the asset. The server is configured to receive social media records from another server, the social media records representing an event. The server is further configured to generate a control signal representing the one or more social media records. The server computes event location information based on the one or more social media records, the event location information comprising the location of the event. The server computes a proximity metric for the control signal based on the asset location information and event location information, said proximity metric comprising the distance between the event and the asset. The server computes a severity metric for the control signal based on the one or more social media records. The server determines whether or not to transmit the control signal to the computing device based on the proximity metric and the severity metric.

It is a further aspect of the present disclosure to provide a method for managing electronic data representing electronic alerts.

The above aspect can be attained by receiving social media records representing an event and generating a control signal based on the social media records. Next, a confidence metric is computed for the control, and if the confidence threshold is met, a severity metric is also computed. If the severity metric meets a predetermined global threshold for severity, the control signal is transmitted to all of the devices. If the global threshold for severity is not met, event location information is computed based on the contents of the social media records, and asset location information is obtained from a computing device associated with an asset. The distance between the event and the asset is then calculated using the asset location information and event location information. A combined metric is computed based on both the severity metric and the distance between the event and the asset. Each of the devices transmits a threshold for the combined metric, and if the threshold for the combined metric is met, the control signal is transmitted to the respective device(s).

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

The present disclosure pertains to a system for transmitting control signals in response to social media data records. The control signal is transmitted by a server to a computing device. The control signals can cause the computing device to control an alarm system, a vehicle navigation system, an automated email system, or an automated messaging system, but the control signal is not particularly limited. A useful example of a control signal, as discussed below, is an alert.

The methods, functionality, and other techniques discussed herein may be carried out by instructions, which may be directly executable (e.g., a binary file), indirectly executable (e.g., bytecode), interpreted (e.g., a script), or otherwise executable by a processor. Instructions may be stored in a non-transitory computer-readable medium, such as a memory, hard drive, or similar device.

Figure 1:
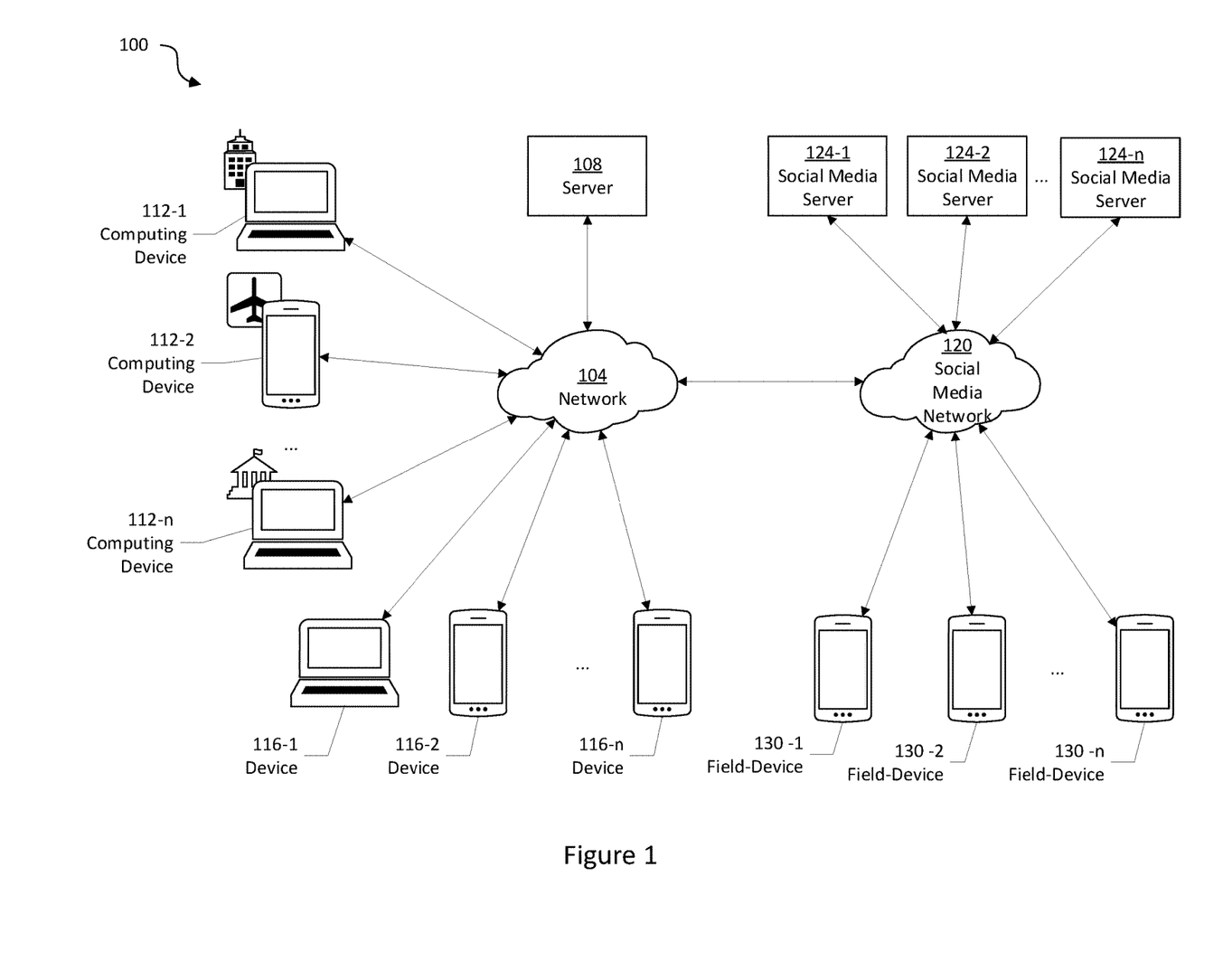
FIG. 1 is a system diagram showing a system for managing electronic data representing emergency alerts.

Referring now to FIG. 1, a system for managing alerts is indicated generally at 100. System 100 comprises a network 104 connected to a server 108 and further connected to a plurality of first computing devices 112-1, 112-2 . . . 112-*n* (generically referred to herein as "computing device 112" or collectively as "computing device 112") and a second plurality of target computing devices 116-1, 116-2 . . . 116-*n* (generically referred to herein as "devices 116" and collectively as "devices 116". This nomenclature is used elsewhere herein). The network 104 is further connected to a social media network 120. The social media network 120 is connected to a plurality of social media servers 124-1, 124-2 . . . 124-*n*. The social media network 120 is further connected to a third plurality of field-devices 130.

The server 108 is typically a server or mainframe with a housing containing an arrangement of one or more central processing units, volatile memory (i.e. random access memory), persistent memory (i.e. hard disk devices) and a network interface (to allow the server 108 to communicate over the network 104) all of which are interconnected by a bus. In some embodiments, the server 108 is a virtual server.

As explained in detail below, the server 108 is configured to receive alerts from the social media network 120 and forward alerts to the devices 116 via the network 104.

The network 104 can be wired or wireless, or based on combinations thereof, and based on any type of known network architecture or platform, (e.g. the Internet or a wide area network) or combinations thereof. Generally, network 104 provides an infrastructure to interconnect the server 108, the devices 116, and the computing devices 112.

The computing device 112 can be a wearable device, smart glasses, GPS tracking device, smartphone, tablet, personal computer, vehicle navigation system, smart home system, smart appliance, smart television, building security system, general security operations center, or the like, and is configured to transmit location information to the server 108 via the network 104. In some implementations, the computing device 112 is further configured to receive alerts from the server 108.

The device 116 can be a wearable device, smart glasses, GPS tracking device, smartphone, tablet, personal computer, vehicle navigation system, smart home system, smart appliance, smart television, building security system, general security operations center, or the like, and is configured to receive alerts from the server 108. The device 116 can be configured to receive inputs from a user, the inputs representing preferences for display settings, alert types, alert thresholds, and/or assets of interest to the user, such that the user receives electronic alerts about emergency events occurring near a particular asset or assets of interest. The device 116 can be further configured to display alerts at a user interface.

Alerts can be delivered to the devices 116 and computing devices 112 by the server 108 based on social media information received from the social media servers 124. The social media server 124 is typically a server or mainframe with a housing containing an arrangement of one or more central processing units, volatile memory (i.e. random access memory), persistent memory (i.e. hard disk devices) and a network interface (to allow the server 124 to communicate over the social media network 120) all of which are interconnected by a bus. In some embodiments, the social media server 124 can be a virtual server or a cloud-based server with many mirrors. The social media server is configured to receive social media information from the field devices 130.

The social media network 120 can be wired or wireless, or based on combinations thereof, and based on any type of known network architecture or platform, (e.g. the Internet or a wide area network) or combinations thereof. Generally, the social media network 120 provides an infrastructure to interconnect the social media server 124, the network 104, and the field-device 130.

The field device 130 can be a smartphone, tablet, personal computer, server, or the like, and is configured to receive inputs from a user, the inputs comprising text, video, photos, and/or location information. The inputs can represent emergency events that have occurred or are occurring. For example, the inputs can be eye-witness accounts, photos and/or videos of the event or the aftermath of the event. In some implementations, the field-device 130 can be located proximal to the location of the respective event. The field-device 130 can be configured to generate one or more social media data records R based on the inputs and transmit the data records R to the social media server 124 via the social media network 120. In other examples, the field device 130 Referring now to FIG. 2, a method for managing alerts in accordance with another embodiment of the invention is represented as a flowchart and indicated generally at 200. In order to assist in the explanation of the method, it will be assumed that method 200 is performed using system 100. Furthermore, the following discussion of method 200 will lead to further understanding of system 100 and/or method 200 can be varied and need not work exactly as discussed herein in conjunction with each other, and that such variations are within the scope of the present invention.

Figure 3:
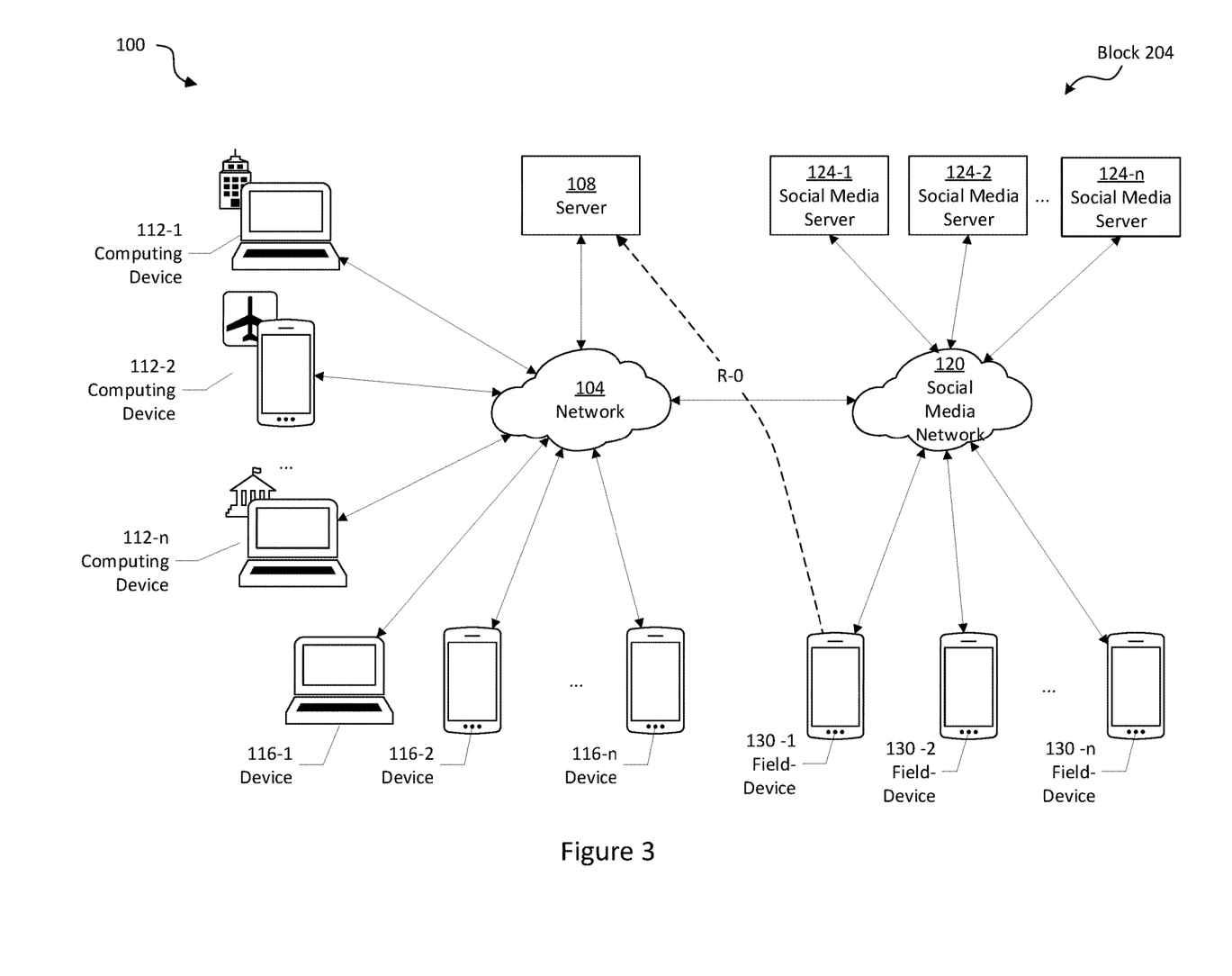
FIG. 3 shows the system of FIG. 1 during exemplary performance of block 204 from the method of FIG. 2.

Block 204 comprises receiving a social media data record representing an event. In system 100, block 204 is performed by server 108 which receives the social media data record R-0. The data record R-0 can include electronic data representing one or more of text, photos, video, user information, and location information, but the specific digital representations of data record R-0 are not particularly limited. Block 204 is represented in FIG. 3, where the data record R-0 is sent from the field-device 130-1 to the server 108. First, the data record R-0 is uploaded via the social media network 120 to the social media server 124. Then, the data record R-0 is transferred from the social media server 124 to the server 108 via the network 104. Once received, the data record R-0 is stored in memory at the server 108. Block 204 may be performed on a continual or periodic basis.

At block 206, server 108 generates an electronic message in the form of an alert A-0 having a payload corresponding to the payload of data record R. The alert A-0 can represent a single data record R or it may represent a plurality of data records R corresponding to the same event. When the server 108 receives a plurality of data records R, it can identify and group data records R that pertain to the same event. A number of suitable methods may be employed to identify and group data records R pertaining to the same event, for example, the server 108 can use machine learning, natural language processing, and knowledge graphs to identify similarities between the data records R. The server 108 may further be configured to identify whether a data record R pertains to a new event or an event for which the server 108 has already generated an alert A-0. As part of block 206, the server 108 can use machine learning, algorithms, natural language processing, and knowledge graphs to generate an alert A-0 representing the contents of the data records R. For instance, the alert A-0 can include the location, date and time of the event, event type, severity of the event, impact, degree of disruption, number of deaths, number of injuries, severity of injuries, photos, video, sound recordings, and number of data records R representing the event. In one example, the time and location of the event are identified through a combination of natural language processing, knowledge graphs, and an algorithm. In another example, the event type is identified through natural language processing and machine learning classification. In another example, photos associated with the event are identified using image recognition software and machine learning classification. In some embodiments, the alert A further represents data records received by the server 108 from a data management server via the network. For example, the environmental data records can include data records representing traffic conditions and data records representing weather conditions.

Figure 2:
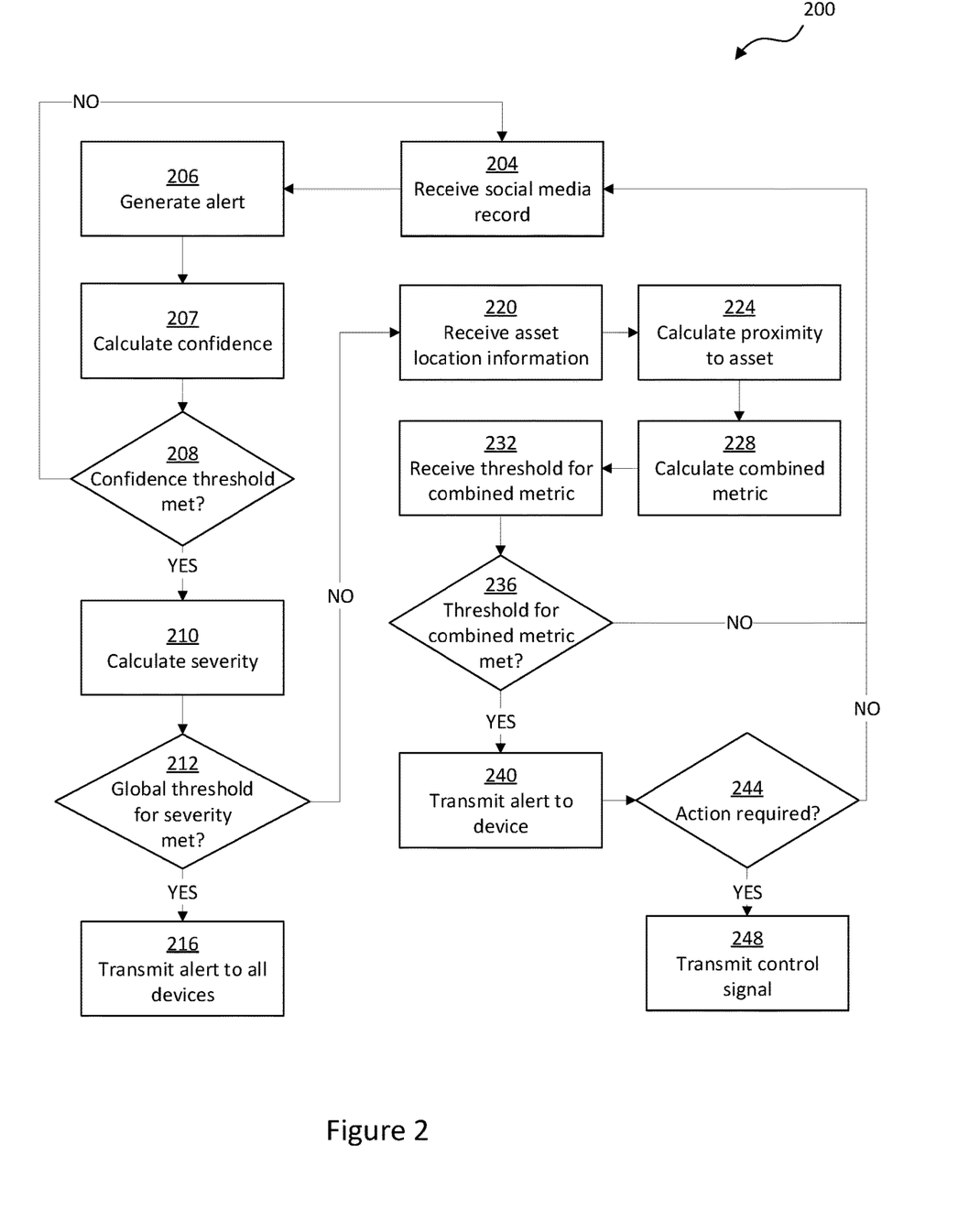
FIG. 2 is a flowchart depicting a method for managing electronic data representing alerts in accordance with another embodiment.

A person of skill in the art will now recognize that block 206 can conserve a significant amount of computing resources at the device 112 and in the network 104. Since the server 108 can transmit a single alert A-0 corresponding to a plurality of data records R, and as will become apparent with the benefit of this specification, method 200 has the benefit of reducing consumption of computing resources by the devices 116 which received a single alert A instead of multiple data records corresponding to the one event. Again, this will be discussed in greater detail below and will become apparent to a person skilled in the art having the benefit of this specification.

Block 207 comprises computing a confidence metric for the alert A-0, the confidence metric representing a probability that an event represented by alert A-0 has occurred or is occurring. In system 100, block 207 is performed by server 108. The server 108 can be configured to perform natural language processing on the data record R-0 and compute the confidence metric by applying machine learning algorithms to the outcomes of the natural language processing. In one embodiment, the confidence metric can be computed based on contents of the data record R-0 as well as the contents of other data records R-1, R-2 . . . (shown in FIG. 8). For example, the alert A-0 can be assigned a higher confidence metric proportional to the number of other data records R-1, R-2 that include their own data that is substantially consistent with the event represented in the first data record R-0. In some embodiments, the confidence metric may depend on the user information included in the data records R. The higher confidence metric may be assigned if the data record R corresponds to a user that has been verified by the respective social media platform, while a lower confidence metric may be assigned to the data record R if the user account is relatively new or is associated with a small number of social media posts. In some embodiments, the server 108 receives news records from at least one other server via the network 104, the news records corresponding to articles or alerts published online by news agencies. If the server 108 identifies similarities between the alert A-0 and at least one of the news records, the confidence metric may be higher than if the server 108 does not identify a similarity to at least one or the news records. In some embodiments, the confidence metric may be computed based on the accuracy of the location information in the data records R.

The server 108 The server 108 can be programmed with a predetermined threshold for the confidence metric. At block 208, the server 108 determines whether or not the predetermined threshold has been met. If the confidence metric is below the predetermined threshold, the method 200 returns to block 204. If the confidence metric is equal to or greater than the predetermined threshold, the method 200 proceeds to block 210.

Block 210 comprises computing a severity metric for the alert A-0. In system 100, block 120 is performed by the server 108. In one embodiment, the severity metric is calculated by the server 108 which is configured to perform natural language processing and image classification on the data record R-0 to identify a number of characteristics of the event including, but not limited to: location, event type, impact, degree of disruption, number of deaths, number of injuries, severity of injuries, number of data records R representing the event, text-based features, weather conditions, earthquake magnitude, hail size, wind speed, and lockdown conditions. The server 108 can use one or more of these characteristics to calculate the severity metric using a machine learning model which relies on a labelled data set stored in memory at the server 108. For example, the server 108 may be programmed with a Gradient Boosting Classifier machine learning model. Based on the labelled data set, the server 108 may use the machine learning model to assign weights to the event characteristics. For example, the machine learning model may calculate a high severity metric if the number of deaths is above a certain threshold, regardless of the other event characteristics.

In embodiments where the severity metric is based on text-based features, the server 108 may be configured to use a natural language processing to identify text-based features in the data records R, and a machine learning model may assign a severity metric based on the text-based features. For instance, language associated with a higher degree with fear or alarm may contribute to a higher severity metric than language associated with jokes or excitement.

In some embodiments, the number of data records R corresponding to an event is used to calculate the severity metric. For example, if the server 108 receives two data records R corresponding to a single event, the server 108 may compute a severity metric that is lower than if the server 108 receives 1000 data records R corresponding to a single event. In some examples, the server 108 can be programmed with a threshold number of data records R corresponding to a severity alert of "low", "medium", or "high". For instance, an alert A-0 can be assigned a severity alert of "medium" or "high" if more than 50 data records R represent the same event. An alert A-0 can be assigned a severity alert of "high" if more than 250 data records R represent the same event.

In some embodiments, the server 108 may first determine the event type and then compute the severity metric based on metrics specific to that event type. For example, the server 108 may use the magnitude on the Richter scale to calculate the severity metric for an earthquake. Similarly, the server 108 may use the size of a hailstone to compute the severity metric for a storm. The result of block 210 is that server 108 can compute the severity metric based on the characteristics of the event.

In other examples, the severity metric can be calculated based on a combination of the number of deaths and the number of injuries. For instance, the server 108 can determine the number of deaths and injuries associated with the event and compute the severity metric, where the severity metric is assigned a numerical value according to the following equation:

$$\text{severity metric} = 2*(\text{number of deaths}) + (\text{number of injuries}) \quad \text{Equation 1}$$

In some examples, the severity metric can comprise categorizing an alert A-0 as "low", "medium", or "high". The server 108 can compute a "low" severity metric for an alert A-0 if the corresponding data record R-0 indicates uncertainty as to whether or not the event has taken place or the data records R represent a low impact event. The server 108 can compute a "medium" severity metric for an alert A-0 if the corresponding data record R-0 represents an event that has caused disruption or where injuries have been reported. The server 108 can compute a "high" severity metric for an alert A-0 if the corresponding data record R-0 represents an event in which, for example, multiple deaths or severe injuries have occurred or are likely to occur.

In yet other examples, the severity metric can comprise an assignment of "low", "medium", or "high" based on a numerical value and the location of the event represented by the data record R-0. First, the server 108 can determine the number of deaths and injuries associated with the event and compute the severity metric, where the numerical value is calculated according to Equation 1. Then, the server 108 can determine whether the location of the event is a public place or a private place. For events in private places and a numerical value of 1-4, the server 108 can assign the alert A-0 a severity metric of "low". For events in private places and a numerical value of 5-6, the server 108 can assign the alert A-0 a severity metric of "medium". For events in private places and numerical value of 7 or more, the server 108 can assign a severity metric of "high". For events in public places and a numerical value of 1, the server 108 can assign the alert A-0 a severity metric of "low". For events in public places and a numerical value of 2-3, the server 108 can assign the alert A-0 a severity metric of "medium". For events in public places and a numerical value of four or greater, the server 108 can assign a severity metric of "high".

In further examples, the server 108 can be configured to assign one or more tags to the alert A-0, the tags corresponding with the location of the event, as determined by machine learning. For instance, the tag can indicate that the event is located at a mall, cathedral, mosque, college, hospital, church, school, a personal residence or other location. In some embodiments, the server 108 receives inputs corresponding to predetermined tags and stores the tags in memory. In other embodiments, the server 108 generates tags by applying a machine learning algorithm the data records R. The server 108 can be programmed with a first and second list of tags, however the server 108 can be programmed with any number of lists of tags. If the data record R-0 contains a tag from the first list of tags, the server 108 will assign the corresponding alert A-0 a minimum severity metric of "medium". If the data record R-0 contains a tag from the second list of tags, the server 108 will assign the corresponding alert A-0 a minimum severity metric of "high".

In still further examples, the server 108 can be configured to assign a severity metric of "low", "medium", or "high" based on the event type and other characteristics corresponding to the event. For instance, the server 108 can be configured to assign a "low" severity metric to an alert A-0 if the corresponding event is a small volcanic eruption or volcanic emissions. The server 108 can be configured to assign a "medium" severity metric to an alert A-0 if the corresponding event is a volcanic eruption causing evacuations or damage to human infrastructure. The server 108 can be configured to assign a "high" severity metric to an alert A-0 if the corresponding event is a volcanic eruption causing deaths or injuries. In another instance, the server 108 can be configured to assign a "low" severity metric to an alert A-0 if the corresponding event is a tornado categorized 0 to 2 on the Enhanced Fujita Scale (EF0-EF2). The server 108 can be configured to assign a "medium" severity metric to an alert A-0 if the corresponding event is a tornado categorized 3 on the Enhanced Fujita Scale (EF3). The server 108 can be configured to assign a "high" severity metric to an alert A-0 if the corresponding event is a tornado categorized 4 or more on the Enhanced Fujita Scale (EF4).

Figure 4:
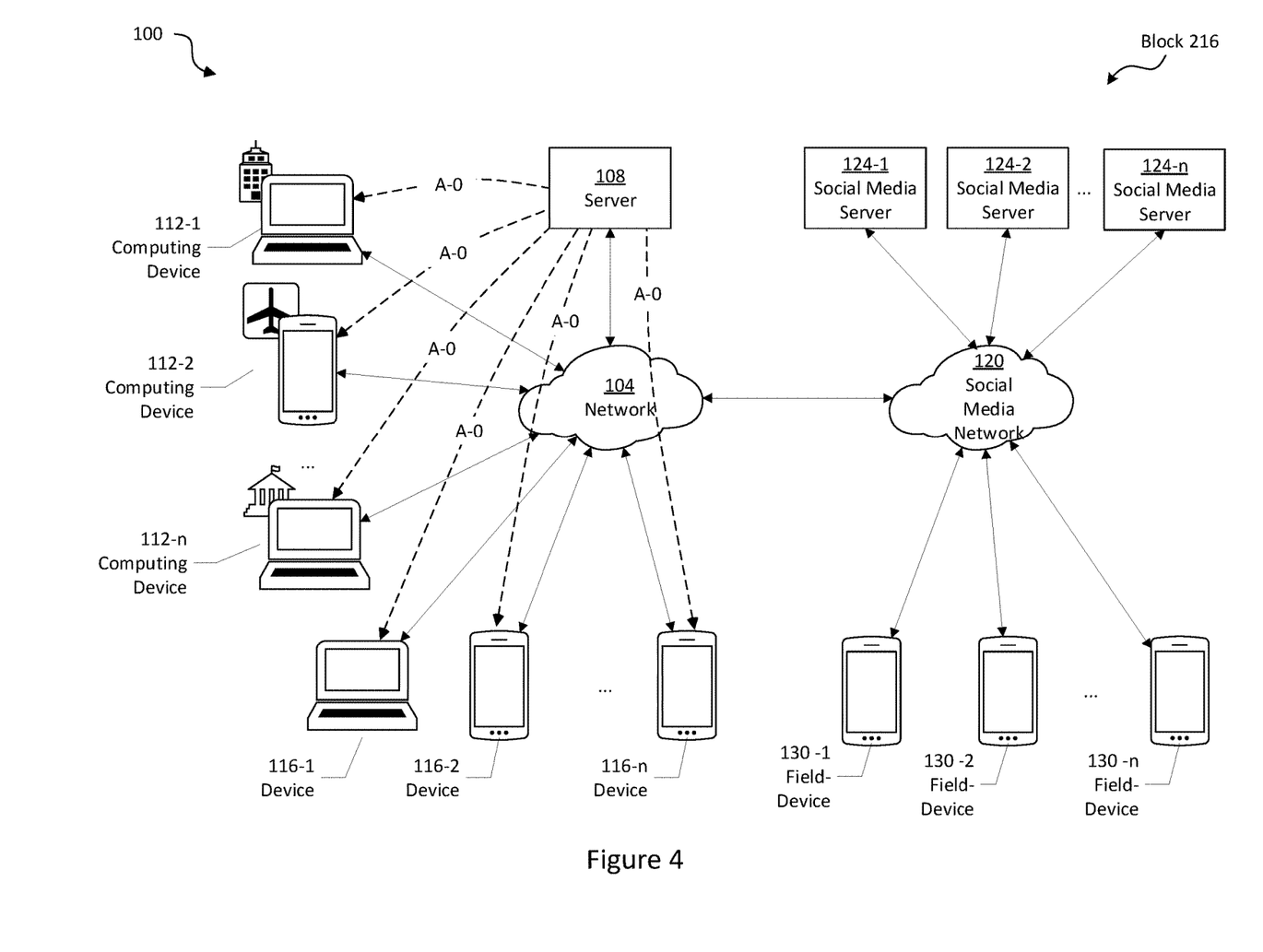
FIG. 4 shows the system of FIG. 1 during exemplary performance of block 216 from the method of FIG. 2.

The server 108 can be programmed with a global threshold for the severity metric. Block 212 comprises determining whether the global threshold for severity has been met. In system 100, block 212 is conducted by the server 108, which compares the global threshold with the severity metric for the alert A-0. If the severity metric meets or surpasses the global threshold, the server 108 transmits the alert A-0 to all the devices 116 and all the computing devices 112 at block 216, as shown in FIG. 4. If the severity metric is less than the global threshold, the method proceeds to block 220.

A person of skill in the art will now recognize that block 216 involves a significant amount of theoretical usage of all the computing resources in system 100, since alert A-0 is being transmitted to all devices 116, and as will become apparent with the benefit of this specification, method 200 has the benefit of the "no" branch from block 212 and the following blocks, such that alerts that do not qualify for treatment at block 216 will only be sent to certain target devices 116, thereby, at a minimum, reducing consumption of computing resources by all devices 116 that did not receive the alert. Again, this will be discussed in greater detail below and will become apparent to a person skilled in the art having the benefit of this specification.

Figure 5:
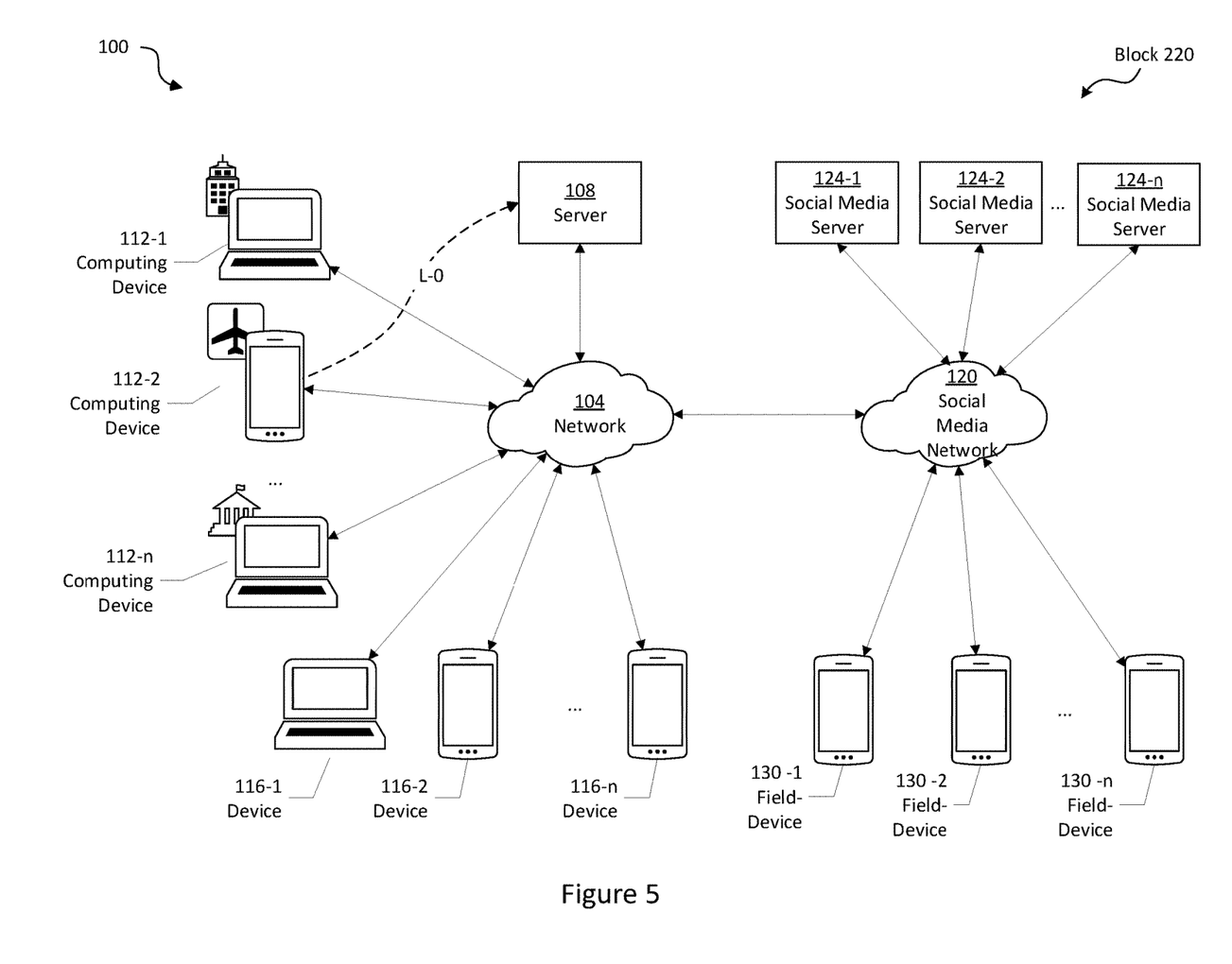
FIG. 5 shows the system of FIG. 1 during exemplary performance of block 220 from the method of FIG. 2.

Block 220 comprises receiving asset location information from a computing device 112 representing an asset associated with a respective computing device 112. The asset can include, but is not limited to, a building respective to device 112-1 or an airplane, respective to device 112-2. Other asset types such as people, infrastructure or vehicles other than aircraft, will now occur to those skilled in the art. In system 100, block 220 is performed by the server 108, which receives the location information for the asset and stores the asset location information in the memory. Block 220 is represented by FIG. 5, which shows computing device 112-2 transmitting asset location information L-0 to the server 108 via the network. The asset location information L-0 corresponds to the location of the asset. The asset location information can be granular location or regional. The asset location information can comprise a set of global positioning system (GPS) coordinates or other data string representing location Block 224 comprises calculating the proximity of device 112 associated with a given asset to the event corresponding to the alert A-0. In system 100, block 224 is performed by the server 108, which calculates a proximity metric based on the asset location information and the event location information. As part of block 224, the server 108 generates event location information, the event location information representing a geographic location or region associated with the event. The location of the event can be granular or regional. In some examples, the server 108 generates event location information based on the location data included in the data record R-0. In other examples, the server 108 determines the location of the event by performing natural language processing on the text included in the data record R-0. Using either the location data or outputs from natural language processing, the server 108 can then assign a set of GPS coordinates to the event location, the set of geographic coordinates representing the event location information. In instances where the location is determined to be a region, the server 108 may generate the event location information as a set of coordinates corresponding to the center of the region. By comparing the event location information with the asset location information, the server 108 calculates the proximity metric, expressed as a distance between the asset and the event.

Block 228 comprises calculating a combined metric representing both the severity metric and the proximity metric. In system 100, block 228 is performed by the server 108, which calculates the combined metric based on the severity metric calculated at block 210 as well as the proximity metric previously calculated at block 224. The server 108 is configured to calculate the combined metric such that the combined metric is correlated to the severity metric but inversely correlated to the proximity metric. If the proximity metric is low (i.e. the event is close to the asset), the combined metric will be higher than if the proximity metric is high (i.e. the event is distant from the asset).

Figure 6:
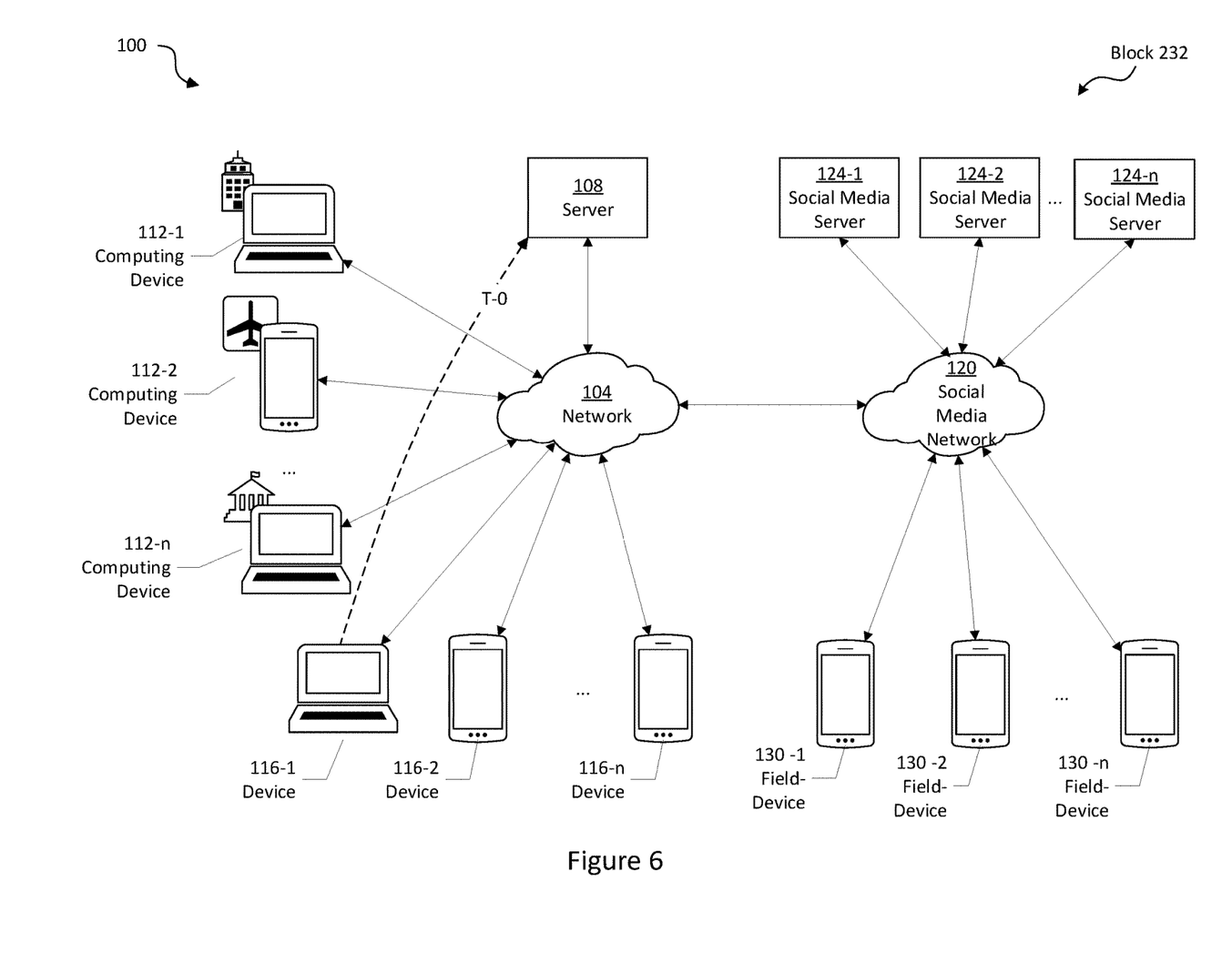
FIG. 6 shows the system of FIG. 1 during exemplary performance of block 232 from the method of FIG. 2.

Block 232 comprises receiving threshold data representing a defined threshold for the combined metric. In system 100, block 232 is performed by the server 108, which receives threshold data from a given device 116. Block 232 is represented by FIG. 6 which shows the device 116-1 transmitting threshold data T-0 to the server 108 via the network 104. The threshold data T-0 represents a defined threshold for the combined metric. The threshold data T-0 can be expressed in the same format as the combined metric, for instance, the threshold data T-0 can express the defined threshold as a numerical value or as a "low", "medium", or "high" value. In some examples, the threshold data T-0 can be stored in memory at the server 108 in association with an identifier corresponding to the device 116. Thus, the device 116 does not need to transmit the threshold data T-0 each time the method 200 is performed.

The means by which threshold data is represented, and ultimate thresholds determined, is not particularly limited. In some implementations, the threshold data can express the defined threshold as a threshold proximity (or physical distance) metric for receiving a "high", "medium", or "low" severity alert. For instance, the threshold data could comprise a first threshold proximity metric for transmitting a "high" severity alert. If the proximity metric is greater than the first threshold proximity metric and the severity metric is "high", an alert A will not be transmitted to the device 116-1. If the proximity metric is equal to or less than the first threshold proximity metric and the severity metric is "high", the alert A will be transmitted to the device 116-1. The threshold data could further comprise a second threshold proximity metric for transmitting a "medium" severity alert. If the proximity metric is greater than the second threshold proximity metric and the severity metric is "medium", the alert will not be transmitted to the device 116-1. If the proximity metric is equal to or less than the second threshold proximity metric and the severity metric is "medium", the alert will be transmitted to the device 116-1. The threshold data could further comprise a third threshold proximity metric for transmitting a "low" severity alert. If the proximity metric is greater than the third threshold proximity metric and the severity metric is "low", the alert A will not be transmitted to the device 116. If the proximity metric is equal to or less than the third threshold proximity metric and the severity metric is "low" the alert A will be transmitted to the device 116-1. (Note that the aforementioned transmissions occur at block 240, which will be explained in greater detail below. However also note that where there is no transmission, transmission bandwidth and associated computing resources at device 116-1 are preserved, thereby resulting in an overall savings of computing resources. This benefit scales beyond this specific example and is one general advantage to method 200.)

As part of block 232, the device 116 can further transmit an input to the server 108 to select one or more assets via the asset's respective computing device 112. In examples where more than one asset is selected, the threshold data T-0 may include a unique threshold corresponding to each of the assets, or the threshold data T-0 may include a single threshold that is applied to all of the assets. At block 236, the combined metric that was calculated with the location information corresponding to the selected asset will be compared to threshold data T-0 provided by the device 116. In some examples, a data record for the selected asset(s) can be stored in memory at the server 108 in association with an identifier corresponding to the computing device 112. Thus, the computing device 112 does not need to transmit an input each time the method 200 is performed.

Figure 7:
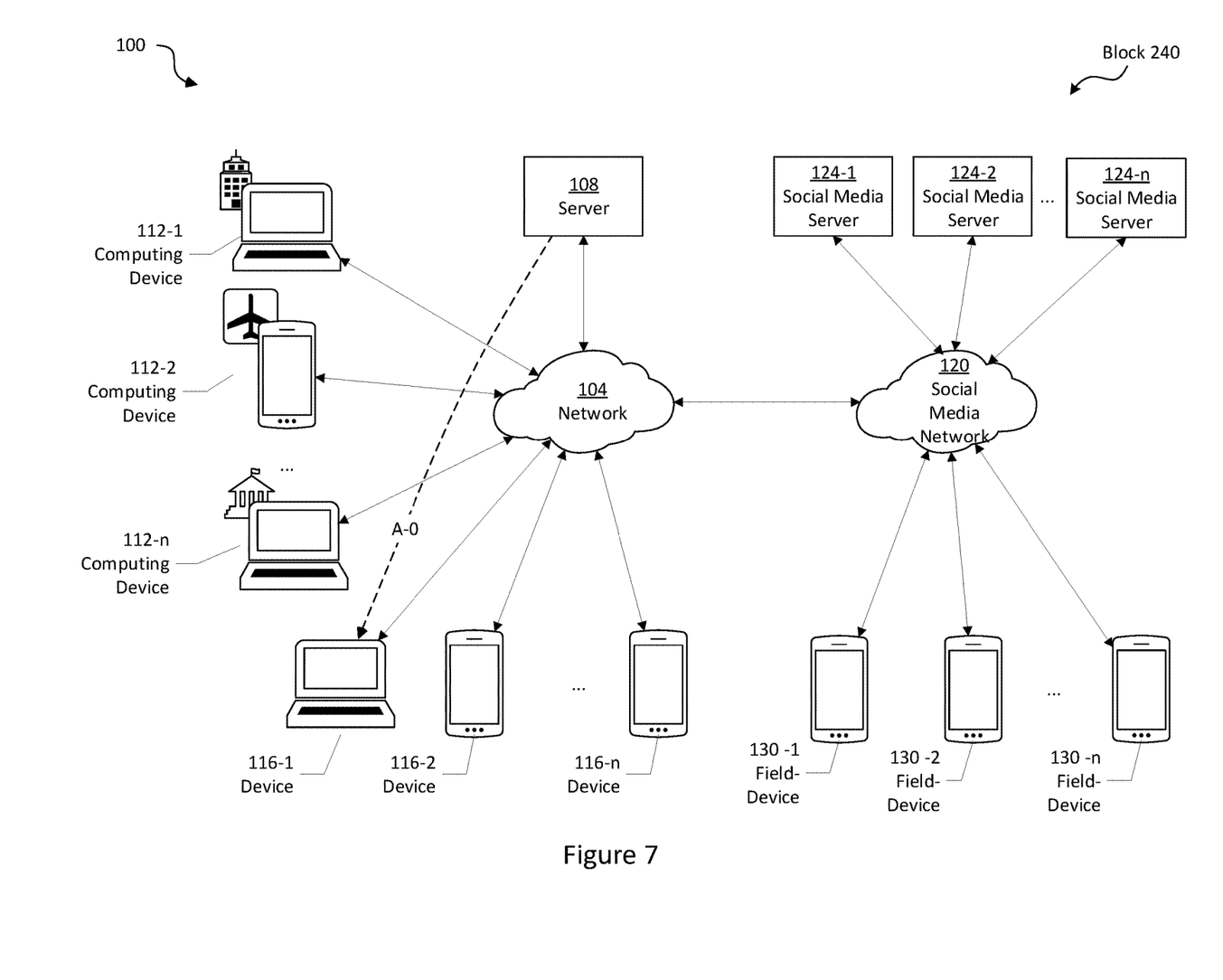
FIG. 7 shows the system of FIG. 1 during exemplary performance of block 240 from the method of FIG. 2.

At block 236, the server 108 compares the threshold data T-0 with the combined metric. In the system 100, block 236 is conducted by the server 108, which compares the defined threshold with the combined metric. If the combined metric is less than the defined threshold, no alert is transmitted and the method returns to block 204. If the combined metric meets or surpasses the defined threshold, the server 108 generates and transmits an alert A-0 to the device 116 represented by the defined threshold, as shown at block 240. Block 240 is represented by FIG. 7, which shows the server 108 transmitting an alert A-0 to the device 116-1 via the network 104. The alert A-0 can be formatted to display some or all of the following on the device 116, although the alert A-0 is not particularly limited: the combined metric, the proximity metric, the severity metric, a headline, the event type, a description of the event, images, video, sound recordings, hyperlinks to web pages, and the data records R-0, R-1, R-2 corresponding to the event. In some instances, the severity metric is indicated as "high", "medium", or "low", or the severity metric may be indicated by colours corresponding to "high", "medium", or "low". The format of the alert A-0 may depend in part on the device 116 receiving the alert A-0. For instance, if the device 116 has a small display, the alert A-0 may comprise the severity metric and a single headline indicating a portion of the total data associated with the event. If the display 116 has a large display, the alert A-0 may further comprise media and additional data associated with the event. The format of the alert A-0 may further depend on inputs received by the device 116, the inputs representing preferences.

Figure 9:
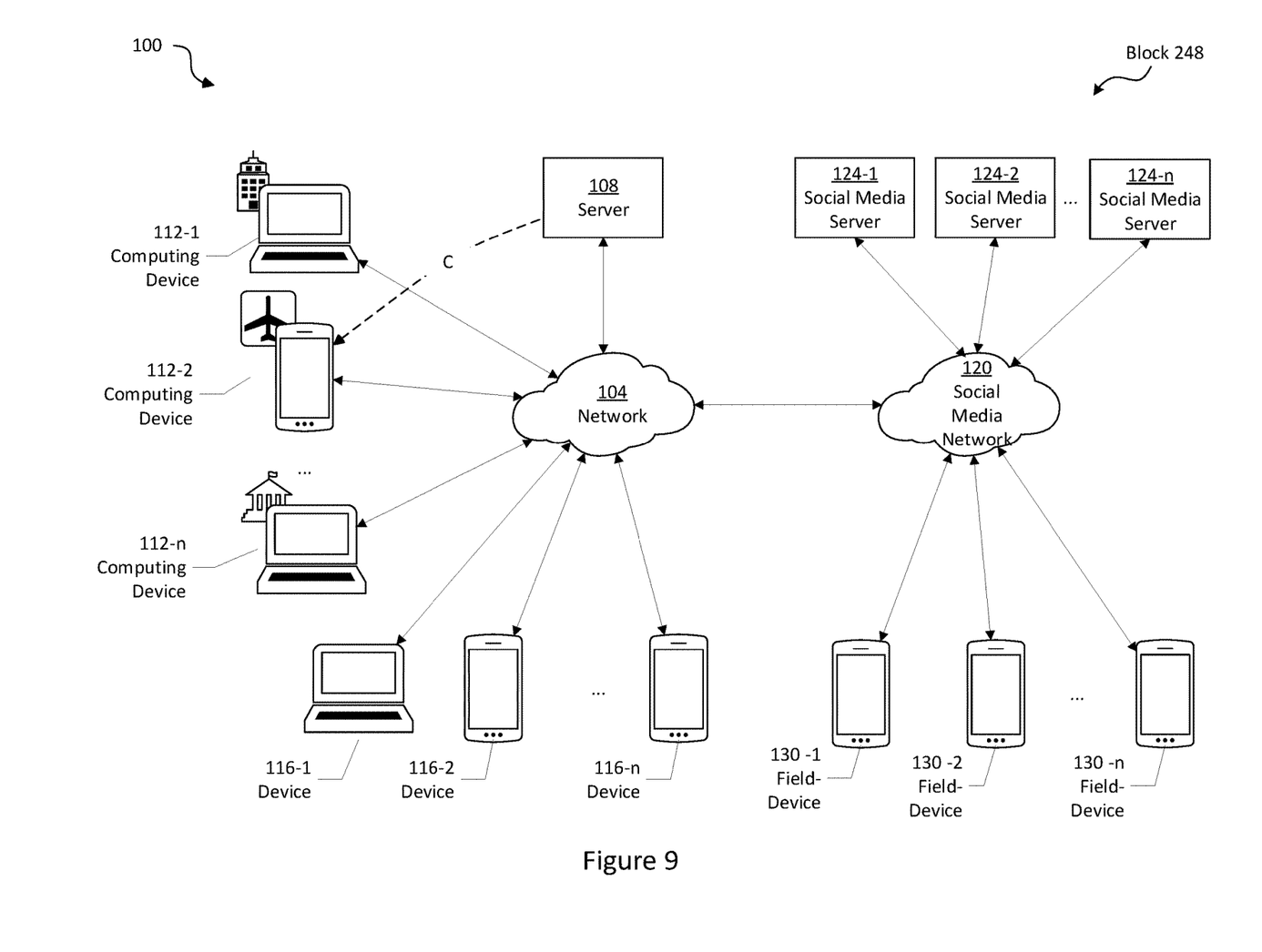
FIG. 9 shows the system of FIG. 1 during exemplary performance of block 248 from the method of FIG. 2.

At block 244, the server 108 determines whether or not a response is required by the device 112, 116. The determination at block 244 can be calculated based on the alert A and the location data L transmitted by the device 116. The device 112, 116 may be configured to transmitted additional data to the server 108 representing the asset or systems controlled by the device 112, 116 and the determination at block 244 may be further based on this additional data. The additional data may be stored in memory at the server 108 and may be updated periodically or continually. If the server 108 determines that a response is required, the server 108 transmits a control signal C to the computing device 112-2 at block 248, as illustrated in FIG. 9.

The control signal C will now be described by way of example. In one example, the server 108 may transmit a control signal C to the device 112, 116 that causes the device 112, 116 to activate an automated email service. In response, the device 112, 116 sends a signal to an email server causing the server to transmit automated emails, the emails including the alert A. In another example, the device 112, 116 may control an automated short message service (SMS) server. The server 108 may transmit a control signal C controlling the device 112, 116 to send a signal to an SMS server, the signal controlling the SMS server to transmit SMS messages that may include the alert A. In another example, the asset associated with the device 112 is a building and the device 112 controls an alarm system in the building. In this example, the control signal C causes the device 112 to activate the alarm system in response to the alert A. If the alert A indicates there is a fire in the building, the control signal C may control the device 112 to close fire doors, unlock emergency exits, activate audible alarms, activate emergency lights, and transmit a signal to a device associated with a local emergency service. If the alert A indicates that there is an active shooter in the building, the control signal C may activate security cameras, close and lock doors, activate speakers to play a pre-recorded audio message, and transmit a signal to a device associated with a local emergency service. If the alert A indicates the emergency has ended, the control signal C may control the device 112 to deactivate the alarm system. In another example, the asset associated with the device 112 is a vehicle and the device 112 controls a navigation system associated with the vehicle. In this example, the control signal C causes the device 112 to redirect the vehicle to avoid an emergency situation that is along or near a route programmed in the navigation system. In a further example, the device is a personal computing device or smartphone that is programmed with a travel itinerary and the control signal C may control the device to regenerate a travel itinerary. For instance, if the alert A indicates there is an emergency near a hotel in the travel itinerary, the control signal C controls the device 166 to check availabilities at other hotels in the same city by receiving reservation data from a server associated with the other hotels. In yet further examples, the device 112, 116 may be a computing device in a logistics network and the control signal C may cause the device 112, 116 to adjust pricing, inventory, delivery routes, and other factors based on the alert A. Since the determination at block 244 sometimes does not result in a control signal C being transmitted to the device 112, 116, the system 100 conserves bandwidth over the network 104 and computing resources at the devices 112, 116.

In some embodiments, one or both of the severity and proximity metrics may be updated on a continual or periodic basis. For example, the server 108 may periodically or continually receive additional social media records R. Based on the additional social media records R, the server 108 can update the severity metric and the proximity metric. Using the updated severity metric and updated proximity metric, the server 108 can update the combined metric. If the updated combined metric exceeds the threshold for the combined metric, the server 108 transmits the alert A to the device 116. In another example, the computing device 112 may transmit, and the server 108 may receive, updated asset location information on a periodic or continual basis. Based on the updated asset location information, the server 108 can update the proximity metric and use the updated proximity metric to update the combined metric. If the updated combined metric exceeds the threshold for the combined metric, the server 108 transmits the alert to the computing device 112. It may now be apparent that using this feature, the computing device 112 can receive substantially current information regarding events in the vicinity of a mobile asset, such as a vehicle or a person, without receiving alerts about events that are distal from the mobile asset. Further, the computing device 112 can receive alerts about events only after the event reaches a threshold severity. For example, the computing device 112 may receive an alert about a windstorm that has developed into a tornado, without receiving alerts about windstorms that do not develop into tornados.

Figure 8:
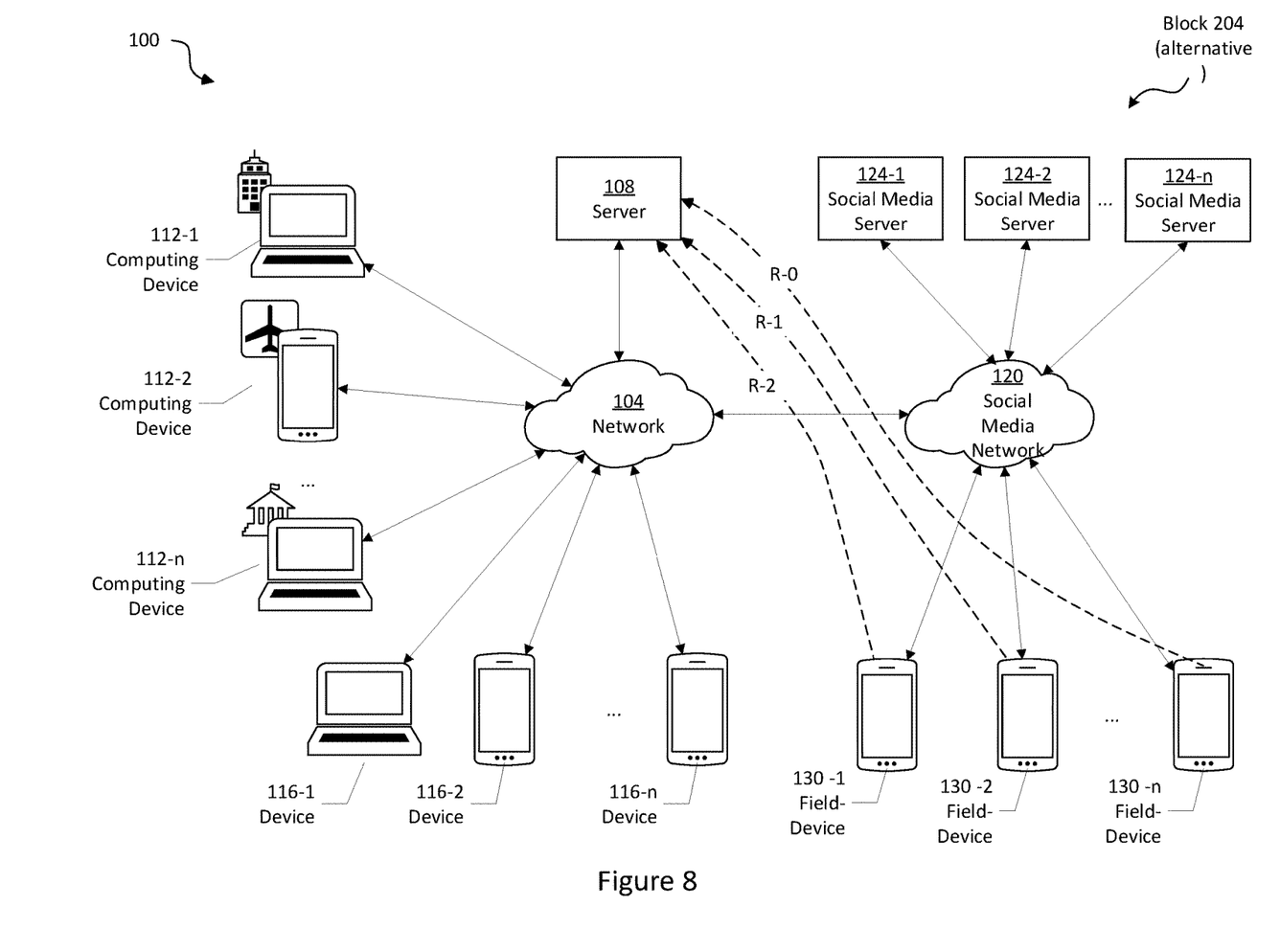
FIG. 8 shows the system of FIG. 1 during exemplary performance of block 204 from the method of FIG. 2.

Because a data record R sometimes does not result in an alert A being transmitted by the server, the server 108 can receive multiple data records R representing multiple events. This is shown in FIG. 8, which depicts the field devices 130 transmitting the records R-0, R-1, R-2 to the server 108. When the server 108 processes the data records R according to the method of FIG. 2, only one of the data records R-0 meets the defined threshold for severity represented in the threshold data T-0 received from the device 116-1. Consequently, the device 116-1 only receives the alert A-0 (as previously shown in FIG. 7 representing block 240) thereby conserving computing resources at the remainder of computing devices 112, unlike block 216 which results in consumption of computing resources at all computing devices 112.

While the foregoing describes certain embodiments, a person of skill in the art will now understand that combinations, variations and subsets of those embodiments are contemplated. For example, in one variation, the device 116 can be implemented using the device 112. Thus, the foregoing description of the operation of device 116 and the device 112 as two separate devices would be applicable as if they were a single device. In another variation, the asset represented by computing device 112 can be a person. In this example, computing device 112 can be a wearable device, smartphone, GPS tracking device, or other device capable of transmitting location information to the server 108.

Finding pertinent information can be frustrated by the methods and processes that are implemented by many social media platforms. These methods are often based on a device's prior online activity, which can bias the information that is delivered to a particular device, thereby potentially wasting resources on the device. These systems pose a significant challenge for delivering alerts to devices that can be acted upon, and without consuming an overwhelming amount of computing resources. Indeed, social media is one of the most significant applications that consume computing resources, including processing power, memory, power and bandwidth. These resources are constantly strained due to sheer volume of social media data. The present invention provides a novel system and method for managing these types of data comprising electronic alerts in that: the computing devices 112, the devices 116, and the network 104 are used more efficiently as the network 104 can focus on delivering alerts corresponding to a selection of the social media records retrieved by the server 108, rather than delivering alerts for all of the social media records retrieved. Moreover, the storage resources on the devices 116 and the computing devices 112 are more efficiently utilized as the devices 116 and the computing devices 112 do not need to store all of the social media records retrieved. Additionally, the systems and methods provided herein allow for more efficient use of computing resources on the computing devices 112 and devices 116 due to the relevance of the alerts received from the server 108, which in turn do not require additional analysis or curation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents can be resorted to, falling within the scope of the invention.

What is claimed is:

1. A system for managing electronic data representing emergency alerts comprising:
   a computing device associated with an asset, said computing device configured to transmit asset location information corresponding to the location of the asset;
   a server configured to:
   receive from the computing device, the asset location information;
   receive from a social media server, one or more social media records representing an event;
   generate a control signal representing the one or more social media records, the control signal comprising an alert;
   compute event location information based on the one or more social media records, said event location information comprising the location of the event;
   compute a proximity metric for the control signal based on the asset location information and the event location information, said proximity metric comprising a distance between the event and the asset;
compute a severity metric for the control signal based on the one or more social media records;
compute a confidence metric for the alert, the confidence metric representing a probability that the event occurred or is occurring;
determine whether or not to transmit the control signal to the computing device based on the confidence metric, the proximity metric and the severity metric; and
if the confidence metric exceeds a predetermined threshold and the proximity metric or the severity metric exceeds the predetermined threshold, transmit the control signal to the computing device.

2. The system of claim 1 wherein the control signal directs the computing device to activate an alarm system.

3. The system of claim 1 wherein the control signal directs the computing device to control a navigation system.

4. The system of claim 1 wherein the control signal directs the computing device to control an automated email system.

5. The system of claim 1 wherein the control signal directs the computing device to control a small message service system.

6. The system of claim 1 further comprising:
a plurality of computing devices, including the computing device, each computing device associated with a respective asset and configured to transmit the asset location information corresponding the location of the respective asset; and
a device for receiving alerts, said device configured to receive an input for selecting one of the assets and transmit the input to the server;
wherein the server is further configured to:
receive from the plurality of computing devices, the asset location information;
compute a proximity metric for each respective asset based on the respective asset location information and the event location information, said proximity metric comprising a distance between the event and the respective asset;
determine whether or not to transmit the alert to the device based on the respective proximity metric for the selected asset; and
if the proximity metric exceeds a predetermined threshold, transmit the alert to the device.

7. The system of claim 6 further comprising a plurality of devices for receiving alerts, wherein the server is configured to transmit the alert to the plurality of devices if the severity metric exceeds a predetermined global threshold.

8. The system of claim 1:
wherein the server is further configured to calculate a combined metric based on the severity metric and the proximity metric and transmit the alert to the computing device if the combined metric exceeds a threshold for the combined metric.

9. The system of claim 8 wherein the computing device is further configured to receive an input comprising a threshold for the combined metric and transmit said input to the server.

10. The system of claim 1 wherein the server is further configured to apply natural language processing and a machine learning algorithm to the one or more social media records to compute the severity metric.

11. The system of claim 1 wherein the server is further configured to apply natural language processing and knowledge graphs to the one or more social media records to compute the event location information.

12. The system of claim 1 wherein the server is configured to receive further social media records, update the severity metric based on the further social media records, and determine whether or not to transmit the alert to the computing device based on the updated severity metric.

13. The system of claim 1:
wherein the computing device is further configured to transmit updated asset location information; and
wherein the server is further configured to receive the updated asset location information, update the proximity metric based on the updated location asset information, and determine whether or not to transmit the alert to the computing device based on the updated proximity metric.

* * * * *

UNITED STATES PATENT AND TRADEMARK OFFICE
CERTIFICATE OF CORRECTION

| | | |
|---|---|---|
| PATENT NO. | : 12,022,371 B2 | Page 1 of 1 |
| APPLICATION NO. | : 17/127193 | |
| DATED | : June 25, 2024 | |
| INVENTOR(S) | : Tierney et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this
Sixteenth Day of September, 2025

Coke Morgan Stewart
*Acting Director of the United States Patent and Trademark Office*